US011958034B2

United States Patent
Weston et al.

(10) Patent No.: US 11,958,034 B2
(45) Date of Patent: Apr. 16, 2024

(54) ACTIVATED AMINO CONTAINING METAL ORGANIC FRAMEWORK (MOF) COMPOSITIONS, PROCESS OF MAKING AND PROCESS OF USE THEREOF

(71) Applicant: NuMat Technologies Inc., Skokie, IL (US)

(72) Inventors: Mitchell Hugh Weston, Chicago, IL (US); Edwin Alfonso Argueta Fajardo, Chicago, IL (US); William Morris, Chicago, IL (US); John Paul Siegfried, Chicago, IL (US); Patrick Emmett Fuller, Chicago, IL (US)

(73) Assignee: NuMat Technologies, Inc., Skokie, IL (US)

( * ) Notice: Subject to any disclaimer, the term of this patent is extended or adjusted under 35 U.S.C. 154(b) by 158 days.

(21) Appl. No.: 17/217,845

(22) Filed: Mar. 30, 2021

(65) Prior Publication Data
US 2021/0379560 A1 Dec. 9, 2021

Related U.S. Application Data

(60) Provisional application No. 63/003,260, filed on Mar. 31, 2020.

(51) Int. Cl.
*B01D 53/04* (2006.01)
*B01J 20/22* (2006.01)
(Continued)

(52) U.S. Cl.
CPC ............ *B01J 20/226* (2013.01); *B01D 53/04* (2013.01); *B01J 20/28011* (2013.01);
(Continued)

(58) Field of Classification Search
CPC ........ B01D 39/00; B01D 46/00; B01D 53/56; B01J 20/22; B01J 8/02; C01C 1/12;
(Continued)

(56) References Cited

U.S. PATENT DOCUMENTS

| 4,706,705 A | 11/1987 | Lee, II |
| 9,474,997 B1 | 10/2016 | Peterson et al. |

(Continued)

FOREIGN PATENT DOCUMENTS

| CN | 106784895 A | 5/2017 |
| CN | 109395698 A | 3/2019 |

(Continued)

OTHER PUBLICATIONS

Aiguo Hu et al., Chiral Porous Hybrid Solids for Practical Heterogeneous Asymmetric Hydrogenation of Aromatic Ketones, Department of Chemistry, CB#3290, University of North Carolina, Chapel Hill, North Carolina 27599, J. Am. Chem. Soc. 2003, 125, 11490-11491.

(Continued)

*Primary Examiner* — Sharon Pregler
(74) *Attorney, Agent, or Firm* — Paschall & Associates, LLC; Mark Goldberg

(57) ABSTRACT

This invention relates to metal organic framework (MOF) compositions, methods of preparing them and methods of using them. The MOF compositions are characterized in that at least a portion of the linker molecule is an amino containing organic linker. The MOF also has a crystal size of greater than 1 μm and has been treated with an acid wash to provide a MOF in which at least 55% of the amino groups are activated amino groups of the form —$NH_2$. The MOF compositions are useful in adsorbing various contaminants from various gas stream. One specific example is adsorbing $NO_2$ from an air stream.

19 Claims, 5 Drawing Sheets

(51) Int. Cl.
 B01J 20/28 (2006.01)
 B01J 20/30 (2006.01)
 C07F 7/00 (2006.01)
(52) U.S. Cl.
 CPC ... *B01J 20/28064* (2013.01); *B01J 20/28071* (2013.01); *B01J 20/28073* (2013.01); *B01J 20/3071* (2013.01); *B01J 20/3085* (2013.01); *C07F 7/003* (2013.01); *B01D 2253/204* (2013.01); *B01D 2253/304* (2013.01); *B01D 2253/306* (2013.01); *B01D 2253/311* (2013.01); *B01D 2257/404* (2013.01)
(58) Field of Classification Search
 CPC .. C07F 11/00; C07F 15/02; C07F 3/02; C07F 3/04; C07F 5/06; C07F 7/28
 See application file for complete search history.

(56) References Cited

U.S. PATENT DOCUMENTS

| | | | |
|---|---|---|---|
| 9,868,107 | B1 * | 1/2018 | Peterson .................. C07F 7/28 |
| 11,241,679 | B2 * | 2/2022 | Shen ......................... C07F 3/06 |
| 2004/0081611 | A1 | 4/2004 | Muller et al. |
| 2004/0225134 | A1 | 11/2004 | Yaghi et al. |
| 2007/0068389 | A1 | 3/2007 | Yaghi |
| 2007/0227898 | A1 | 10/2007 | Muller et al. |
| 2009/0198079 | A1 * | 8/2009 | Schubert ............... C07C 51/412 556/55 |
| 2009/0281341 | A1 | 11/2009 | Schubert |
| 2009/0305040 | A1 | 12/2009 | Schubert et al. |
| 2010/0140175 | A1 | 6/2010 | Wyse et al. |
| 2012/0149560 | A1 | 6/2012 | Lee et al. |
| 2012/0259135 | A1 | 10/2012 | Yaghi et al. |
| 2019/0091503 | A1 | 3/2019 | Ryu et al. |
| 2020/0353440 | A1 | 11/2020 | Yaghi et al. |

FOREIGN PATENT DOCUMENTS

| | | |
|---|---|---|
| JP | 0515576 A | 1/1993 |
| JP | 2015046417 A1 | 3/2017 |
| JP | 2015046417 A1 | 3/2017 |
| KR | 101676442 B1 | 11/2016 |
| KR | 1020170124866 A | 11/2017 |
| KR | 20190074374 A | 6/2019 |
| WO | 2004101575 A2 | 11/2004 |
| WO | 2007118874 A1 | 10/2007 |
| WO | 2007118888 A1 | 10/2007 |
| WO | 2008000694 A3 | 1/2008 |
| WO | 2017223046 A1 | 12/2017 |
| WO | 2018062504 A1 | 4/2018 |
| WO | 2020046768 A1 | 3/2020 |

OTHER PUBLICATIONS

Greig C. Shearer et al., Defect Engineering: Tuning the Porosity and Composition of the Metal-Organic Framework UiO-66 via Modulated Synthesis, Department of Chemistry, NIS and INSTM Reference Centre, University of Torino, Via G. Quarello 15, 10135 Torino, Italy, 2016, 28, 3749-3761.
Ross J. Marshall et al., Amino acids as highly efficient modulators for single crystals of zirconium and hafnium metal-organic frameworks, This journal is © The Royal Society of Chemistry 2016, J. Mater. Chem. A, 2016, 4, 6955-6963.
Halka Bilinski et al., Precipitation and Complex Formation of Zirconium(IV) with Maleic and Phthalic Acids at 25° Cla, Inorganic Chemistry, vol. 20, No. 6, 1981, 1882-1885.
Michael J. Katz et al., A facile synthesis of UiO-66, UiO-67 and their derivatives, The Royal Society of Chemistry 2013, Chem. Commun., 2013, 49, 9449-9451.
Jasmina Hafizovic Cavka et al., A new zirconium inorganic building brick forming metal organic frameworks with exceptional stability, Department of Chemistry, Université de Versailles Saint Quentin en Yvelines, Department of Chemistry IFM & NIS Centre of Excellence, University of Torino, pp. S1-S19.
Andrea C. Sudik et al., Design, Synthesis, Structure, and Gas (N2, Ar, CO2, CH4, and H2) Sorption Properties of Porous Metal-Organic Tetrahedral and Heterocuboidal Polyhedra, J. Am. Chem. Soc. 2005, 127, 7110-7118.
Jasmina Hafizovic Cavka et al., A New Zirconium Inorganic Building Brick Forming Metal Organic Frameworks with Exceptional Stability, J. Am. Chem. Soc. 2008, 130, 13850-13851.
Yan Bai et al., Zr-based metal-organic frameworks: design, synthesis, structure, and applications, The Royal Society of Chemistry, Chem. Soc. Rev., 2016, 45, 2327-2367.
Greig C. Shearer et al., Defect Engineering: Tuning the Porosity and Composition of the Metal Organic Framework UiO-66 via Modulated Synthesis, Centre for Research Based Innovation, Department of Chemistry, University of Oslo, pp. 1-210.
Rob Ameloot et al., Ionic Conductivity in the Metal-Organic Framework UiO-66 by Dehydration and Insertion of Lithium tert-Butoxide, Chem. Eur. J. 2013, 19, 5533-5536.
Helen L. Ngo et al., Molecular building block approaches to chiral porous zirconium phosphonates for asymmetric catalysis, Journal of Molecular Catalysis A: Chemical 215 (2004) 177-186.
Kristina Chakarovaa et al., Evolution of acid and basic sites in UiO-66 and UiO-66-NH2 metal-organic frameworks: FTIR study by probe molecules, Science Direct, Microporous and Mesoporous Materials 281 (2019) 110-122.
Joao Marreiros et al., Active Role of Methanol in Post-Synthetic Linker Exchange in the Metal-Organic Framework UiO-66, Chem. Mater. 2019, 31, 1359-1369.
Dong Yang et al., Tuning the Surface Chemistry of Metal Organic Framework Nodes: Proton Topology of the Metal-Oxide-Like Zr6 Nodes of UiO-66 and NU-1000, J. Am. Chem. Soc. 2016, 138, 15189-15196.
Tim Ahnfeldt et al., Synthesis and Modification of a Functionalized 3D Open-Framework Structure with MIL-53 Topology, Inorganic Chemistry, vol. 48, No. 7, 2009, 3057-3064.
Checkers R. Marshall et al., Size control over metal-organic framework porous nanocrystals, The Royal Society of Chemistry 2019, Chem. Sci., 2019, 10, 9396-9408.
Pascal. G. Yot et al., Exploration of the mechanical behavior of metal organic frameworks UiO-66(Zr) and MIL-125(Ti) and their NH2 functionalized versions, The Royal Society of Chemistry 2016, Dalton Trans., 2016, 45, 4283-4288.
Michael Puchberger et al., Can the Clusters Zr6O4(OH)4(OOCR)12 and [Zr6O4(OH)4(OOCR)12]2 be Converted into Each Other?, Eur. J. Inorg. Chem. 2006, 3283-3293.
Asmaa Jrada et al., Structural engineering of Zr-based metal-organic framework catalysts for optimized biofuel additives production, Chemical Engineering Journal 382 (2020) 122793, 1-12.
Ulrich Schubert, Polymers Reinforced by Covalently Bonded Inorganic Clusters, A. Chem. Mater., vol. 13, No. 10, 2001, 3487-3494.
Christopher Andrew Trickett, Deciphering structural heterogeneity in metal-organic frameworks towards an understanding of structure-property relationships, UC Berkeley Electronic Theses and Dissertations, 1-185.
Gregor Trimmel et al., Swelling behavior and thermal stability of poly(methylmethacrylate) crosslinked by the oxozirconium cluster Zr4O2(methocrylate)12, Applied Organometallic Chemistry Appl. Organometal. Chem. 2001; 15: 401-406.
K. M. Zwolinski et al., Towards multifunctional MOFs—transforming a side reaction into a post-synthetic protection/deprotection method, Chem. Commun., 2015, 51, 10030-10033.
K. M. Zwoliński et al., Towards multifunctional MOFs—from side reaction to post-synthetic protection/deprotection strategy, The Royal Society of Chemistry 2015, 1-46.
Matthew J. Cliffe et al., Correlated defect nanoregions in a metal-organic framework, Nature Communications, 2014, 1-8.
"International Preliminary Report on Patentability for PCT/US2021/024951", dated Oct. 13, 2022.
Larry Janssen, "Chemical, Biological, Radiological, and Nuclear (CBRN) Respiratory Protection Handbook", 2018, Publisher: National Institute for Occupational Saftey and Health.

(56) References Cited

OTHER PUBLICATIONS

Japanese Reasons for Refusal for 2022-559295 dated Aug. 18, 2023.
Search Report and Written Opinion for PCT/US2021/024940 dated Jul. 21, 2021.
Office Action for JP2022-55-9295 dated Aug. 18, 2023.
Tina Düren, Franck Millange, Gérard Férey, Krista S. Walton, and Randall Q. Snurr; "Calculating Geometric Surface Areas as a Characterization Tool for Metal-Organic Frameworks," The Journal of Physical Chemistry C 2007 111 (42), 15350-15356; DOI: 10.1021/jp074723h.
Wu, D., Wang, C., Liu, B., Liu, D., Yang, Q. and Zhong, C. "Large-scale computational screening of metal-organic frameworks for CH4/H2 separation," AIChE J., 58: 2078-2084 (2012), https://doi.org/10.1002/aic.12744.
K. Allahyarli et al., "Metal-Organic Framework superstructures with long-ranged orientational order via E-filed assisted liquid crystal assembly," J. Colloid and Interface Sci., 610 (2022) 1027-1034.
Asmaa Jrada, Mohamad Hmadehb, Belal J. Abu Tarbousha, Ghadir Awadaa, Mohammad Ahmada; "Structural engineering of Zr-based metal-organic framework catalysts for optimized biofuel additives production," Chemical Engineering Journal 382 (2020) 122793.
Japanese Office Action for 2022-559295 dated Aug. 18, 2023.
Japanese Office Action for 2022 559296 dated Sep. 13, 2023.
Second Office Action in Japanese Patent Application 2022-559295-machine translation and original Japanese received Feb. 27, 2024.

\* cited by examiner

ACTIVATED AMINO CONTAINING METAL ORGANIC FRAMEWORK (MOF) COMPOSITIONS, PROCESS OF MAKING AND PROCESS OF USE THEREOF

CROSS-REFERENCE TO RELATED APPLICATION

This application claims priority to U.S. Provisional Patent Application No. 63/003,260 filed Mar. 30, 2020.

STATEMENT REGARDING FEDERALLY SPONSORED RESEARCH OR DEVELOPMENT

This invention was made with U.S. Government support under Agreement No. W911SR18C0031 awarded by the US Army Combat Capabilities Development Command Chemical Biological Center (CCDC CBC). The Government has certain rights in the invention.

FIELD

This invention relates to metal organic framework (MOF) compositions which have a linker molecule with an amino group. This invention further relates to a process for preparing and activating the amino groups of the MOF compositions as well as a process for using the MOF compositions.

BACKGROUND

Metal Organic Framework (MOF) materials are well known and have found uses in a number of applications such as air filtration, gas delivery, etc. Most MOFs as synthesized consist of nano-sized crystals. However, nanocrystals are difficult to handle and may not be well suited for some applications. Accordingly, research has been conducted to control the crystal size of MOFs. One way to control the crystal size of MOFs is to use modulators such as carboxylic acids, e.g. formic acid, acetic acid, etc.

Applicants have found that when modulators are used to synthesize larger crystal size MOF compositions, their resulting activity for adsorption of gases is diminished versus nanocrystal size MOF compositions. This is especially true when at least one of the linker molecules has an amino moiety. Applicants have solved this problem by discovering a process which includes washing the as synthesized MOF composition (with an average crystal size of at least 1 μm) with an acid such as hydrochloric acid, nitric acid, or sulfuric acid. The washed MOF is dried and is found to have similar adsorption properties to nanocrystal size MOF compositions.

SUMMARY OF THE INVENTION

One embodiment of the invention is a metal organic framework (MOF) composition comprising:
Corner metal units comprising metal ion atoms where the metal is selected from Zr, V, Al, Fe, Cr, Ti, Hf, Cu, Zn, Ni, Ce, and mixtures thereof, and linker molecules selected from at least one organic ligand containing an amino group or a combination of at least one organic ligand containing an amino group and at least one organic ligand that does not contain an amino group; the MOF characterized in that it has an average crystal size greater than 1 μm and, and in which at least 55% of the amino groups are activated amino groups of the form —$NH_2$.

In another embodiment, the at least one organic ligand containing an amino group is selected from 2-aminobenzene-1,4 dicarboxylic acid ($NH_2$-BDC), 5-aminoisophthalic acid, 3-aminobenzoic acid, 4-aminobenzoic acid and mixtures thereof.

In yet another embodiment the at least one organic ligand that does not contain an amino group is selected from terephthalic acid (BDC), isophthalic acid, benzoic acid, trimesic acid, acrylic acid, and mixtures thereof.

In a specific embodiment the corner metal units comprise zirconium atoms and the linker comprises a ligand that is 2-aminobenzene-1,4 dicarboxylic acid ($NH_2$-BDC).

In another embodiment the MOF has a BET surface area of at least 1000 $m^2/g$.

In yet another embodiment the MOF has an average crystal size from about 1 μm to about 100 μm.

In another embodiment the MOF has pores from about 5 to about 30 Å.

In a further embodiment at least one corner metal unit of the MOF has at least one free coordination site.

In another embodiment the MOF can adsorb at least one contaminant from a gas stream.

In still another embodiment the contaminant which the MOF can adsorb can be selected from the group consisting of cyanogen chloride, hydrogen cyanide, hydrogen sulfide, phosgene, sulfur dioxide, boron tribromide, boron trichloride, bromine, bromine chloride, bromine trifluoride, carbonyl fluoride, chlorine, chlorine pentafluoride, chlorine trifluoride, chlorosulfonic acid, dichlorosilane, ethyl phosphonous dichloride, fluorine, hydrogen bromide, hydrogen chloride, hydrogen cyanide, hydrogen fluoride, hydrogen iodide, hydrogen sulfide, phosphorus trichloride, silicon tetrafluoride, sulfur dioxide, sulfur trioxide, sulfuric acid, sulfuryl chloride, titanium tetrachloride, tungsten hexafluoride, bromine pentafluoride, hydrogen selenide, nitric acid, nitrogen dioxide, nitrogen tetraoxide, nitrogen trioxide and mixtures thereof.

Another embodiment is a process for preparing a metal organic framework (MOF) composition comprising:
a. forming a reaction mixture of a metal compound where the metal is selected from Zr, V, Al, Fe, Cr, Ti, Hf, Cu, Zn, Ni, and Ce and mixtures thereof a ligand selected from at least one organic ligand containing an amino group or a combination of at least one organic ligand containing an amino group and at least one organic ligand that does not contain an amino group; a solvent selected from dimethylformamide, water, ethanol, isopropanol, and mixtures thereof; and a modulator selected from an organic acid, preferably a monocarboxylic acid such as formic acid, acetic acid, benzoic acid, dichloroacetic acid, trifluoroacetic acid and mixtures thereof, optionally mixed with one or more inorganic acids such as hydrochloric acid, nitric acid, and sulfuric acid;
b. reacting the reaction mixture at a temperature and for a time to form the MOF;
c. isolating the MOF to provide a powder of the MOF; and
d. washing the MOF with an inorganic acid selected from hydrochloric acid, nitric acid, sulfuric acid, and mixtures thereof, optionally mixed with one or more organic acids, to provide a MOF in which at least 55% of the amino groups are activated amino groups of the form —$NH_2$ and characterized in that it has an average crystal size greater than 1 μm.

In another embodiment the MOF which has been washed with the acid, is dried at a temperature of about 60° C. to about 150° C. or a temperature from about 60° C. to about 200° C.

A further embodiment is a process for purifying a gas stream comprising:
contacting the gas stream, comprising at least one contaminant, with a metal organic framework (MOF) composition thereby removing at least a portion of at least one contaminant in the gas stream; wherein the MOF comprises corner metal units comprising metal ion atoms where the metal preferably is selected from Zr, V, Al, Fe, Cr, Ti, Hf, Cu, Zn, Ni, and Ce and mixtures thereof and linker molecules selected from at least one organic ligand containing an amino group or a combination of at least one organic ligand containing an amino group and at least one organic ligand that does not contain an amino group, the MOF characterized in that it has an average crystal size at least about 1 μm and, and in which at least 55% of the amino groups are activated amino groups of the form —$NH_2$.

In another embodiment the gas stream is an air stream, and the contaminant is selected from cyanogen chloride, hydrogen cyanide, hydrogen sulfide, phosgene, sulfur dioxide, boron tribromide, boron trichloride, bromine, bromine chloride, bromine trifluoride, carbonyl fluoride, chlorine, chlorine pentafluoride, chlorine trifluoride, chlorosulfonic acid, dichlorosilane, ethyl phosphonous dichloride, fluorine, hydrogen bromide, hydrogen chloride, hydrogen cyanide, hydrogen fluoride, hydrogen iodide, hydrogen sulfide, phosphorus trichloride, silicon tetrafluoride, sulfur dioxide, sulfur trioxide, sulfuric acid, sulfuryl chloride, titanium tetrachloride, tungsten hexafluoride, bromine pentafluoride, hydrogen selenide, nitric acid, nitrogen dioxide, nitrogen tetraoxide, nitrogen trioxide and mixtures thereof.

In yet a further embodiment the MOF removes at least 50% or at least 90% or at least 99% of the contaminants.

These and other objects and embodiments will become clearer after a detailed description of the invention.

DETAILED DESCRIPTION OF THE INVENTION

Figures 1A, 1B:
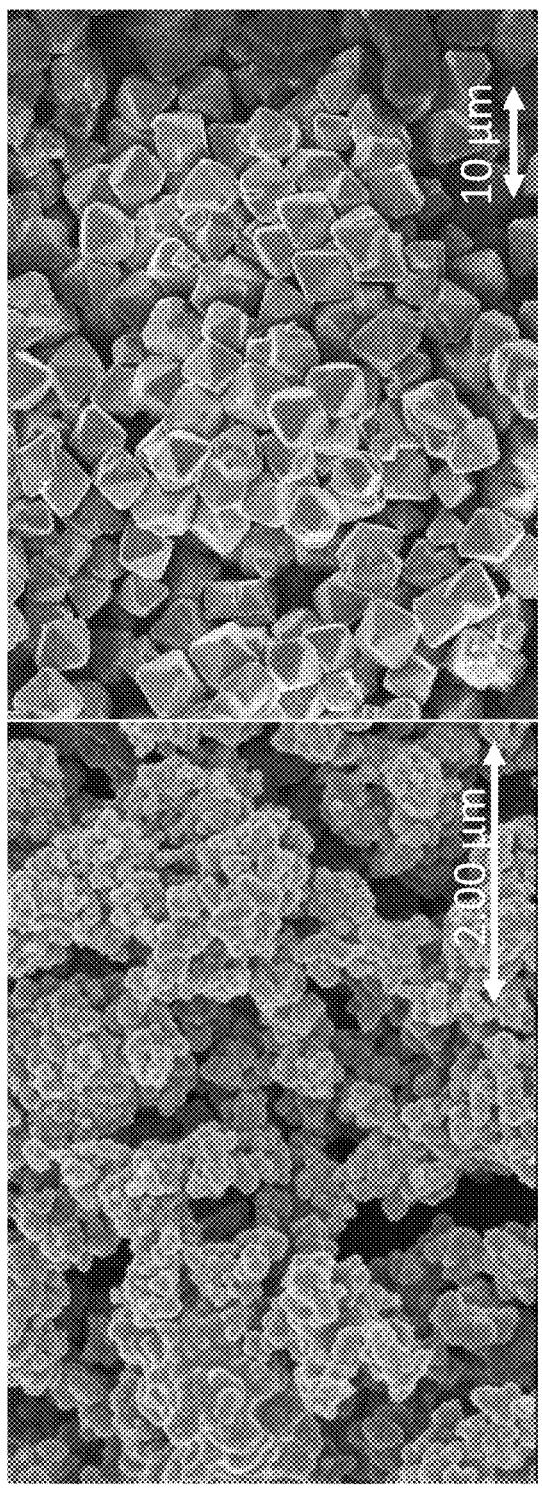
FIG. 1A. Photomicrograph of commercially available Zr($NH_2$-BDC) agglomerates of small nanosized particles (2.00 μm scale).
FIG. 1B Photomicrograph of Zr($NH_2$-BDC) —$NH_2$ of Example 1-1 and having crystal sizes of 1-5 μm (10 μm scale).

In accordance with the disclosure herein, amino-containing metal organic framework (MOF) compositions have been synthesized with an average crystal size of at least about 1 μm or more, and in which the amino groups have been activated to provide more than 55% free amino groups of the form —$NH_2$, the MOFs having a BET surface area of at least 1000 $m^2$/g. Prior to the invention as disclosed herein, MOFs with crystals of at least about 1 μm (micron) which contain a linker molecule with a free amino group have been harder to synthesize. Micron sized MOFs as disclosed herein have advantages in applications such as air filtration, toxic gas capture, respirators etc.

When referring to amino groups, the word "activated" as used herein means that the amino groups are unsubstituted groups of formula —$NH_2$, wherein the nitrogen atom is bonded to an organic ligand of the MOF.

In one aspect of the invention, the MOFs are the coordination product of metal ions and at least bidentate organic ligands. The MOFs comprise corner metal units comprising metal ion atoms and linker, i.e. ligand, molecules which form a framework having high surface area and uniformly sized pores. The metal ions include but are not limited to $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{5+}$, $V^{4+}$, $V^{3+}$, $Nb^{3+}$, $Ta^{3+}$, $Cr^{3+}$, $Cr^{2+}$, $Mo^{3+}$, $W^{3+}$, $Mn^{3+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Al^{3+}$, $Ga^{3+}$, $In^{3+}$, $Si^{4+}$, $Si^{2+}$, $Ge^{4+}$, $Ge^{2+}$, $Sn^{4+}$, $Sn^{2+}$, $Bi^{5+}$, $B^{3+}$, $Cd^{2+}$, $Mn^{2+}$, $Tb^{3+}$, $Gd^{3+}$, $Ce^{3+}$, $La^{3+}$ and $Cr^{4+}$, and combinations thereof. A preferred set or subset of the above metals includes but is not limited to, Zr, V, Al, Fe, Cr, Ti, Hf, Cu, Zn, Ni, and Ce.

The organic ligands which react with the metal ions to form linkers between the corner metal units are selected from at least one organic ligand which contains an amino group or a combination of at least one organic ligand which contains an amino group and at least one organic ligand which does not contain an amino group. Examples of organic ligands containing an amino group include but are not limited to, 2-aminobenzene-1,4 dicarboxylic acid ($NH_2$-BDC), 5-aminoisophthalic acid, 3-aminobenzoic acid, 4-aminobenzoic acid and mixtures thereof. Examples of organic ligands which do not contain an amino group include but are not limited to terephthalic acid (BDC), isophthalic acid, benzoic acid, trimesic acid, acrylic acid, and mixtures thereof. When the ligand is a combination of at least one organic ligand containing an amino group and at least one organic ligand which does not contain an amino group, the molar ratio of amino containing: non-amino containing ligand in the MOF product varies from 1:99 to 99:1 or from 10:90 to 90:10 or from 20:80 to 80:20 or from 30:70 to 70:30 or from 40:60 to 60:40 or 50:50.

In one embodiment the metal of the corner metal unit comprises Zr and the organic ligand comprises 2-aminobenzene-1,4 dicarboxylic acid ($NH_2$-BDC). In one embodiment the MOF is Zr($NH_2$-BDC), also known as UiO-66-$NH_2$.

The MOFs of the present invention are characterized by the following properties. One property is a Brunauer-Emmett-Teller (BET) surface area of at least 1,000 or at least 1,100 or at least 1,200, or at least 1,300 $m^2$/g, or at least 1,400 $m^2$/g. Another property is that the MOFs have an average crystal size of at least 1 μm, or at least 5 μm, or at least 50 μm along at least one dimension. More particularly the crystal size is from at least about 1 μm to about 100 μm, or from about 1 μm to about 10 μm, or from about 1 μm to about 5 μm, or from about 10 μm to about 50 μm. By crystal size is meant the size of the individual crystals and not the size of crystals that have been agglomerated into aggregates. When an average size is given, e.g. 1 μm, it is understood that the crystals have that particular average size in at least one dimension while the size in the other two dimensions may be less or more. That is, the crystals do not have to have cubic geometry, but can have any geometry such as octahedral, truncated octahedral, cubic octahedral, needles, etc.

MOFs have the general property of having an open pore system. The MOFs of the invention have an average pore size of about 5 to about 30 Å, or from about 5 to about 20 Å, or from about 5 to about 10 Å.

The MOFs of the invention have a pore volume of about 0.2 cc/g to about 0.8 cc/g, or from about 0.3 to about 0.8 cc/g, or from about 0.4 to about 0.8 cc/g, or from 0.5 to about 0.8 cc/g, or from about 0.4 to about 0.7 cc/g, or from about 0.4 to about 0.6 cc/g.

The metals ions which form the corner metal unit can either have all their coordination sites occupied or can have at least one free or open coordination site. In a particular embodiment, at least one corner metal unit has at least one free coordination site.

The MOFs of the invention have numerous uses. One particular use is to purify a gas stream by at least partially adsorbing at least one contaminant found in the gas stream. Gas streams which can be purified include but are not limited to air streams, industrial gas streams, off-gassing streams, or pollutant gas streams.

The contaminants which can be adsorbed on the MOFs include but are not limited to cyanogen chloride, hydrogen cyanide, hydrogen sulfide, phosgene, sulfur dioxide, boron tribromide, boron trichloride, bromine, bromine chloride, bromine trifluoride, carbonyl fluoride, chlorine, chlorine pentafluoride, chlorine trifluoride, chlorosulfonic acid, dichlorosilane, ethyl phosphonous dichloride, fluorine, hydrogen bromide, hydrogen chloride, hydrogen cyanide, hydrogen fluoride, hydrogen iodide, hydrogen sulfide, phosphorus trichloride, silicon tetrafluoride, sulfur dioxide, sulfur trioxide, sulfuric acid, sulfuryl chloride, titanium tetrachloride, tungsten hexafluoride, bromine pentafluoride, hydrogen selenide, nitric acid, nitrogen dioxide, nitrogen tetraoxide, nitrogen trioxide and mixtures thereof.

MOFs which have large crystal size of about 1µ or greater are preferred over MOFs which have small or nanocrystal size, particularly in applications involving adsorption of contaminants. The inventors have discovered that modulators used to synthesize crystals larger than nano-size of MOFs bearing amino groups result in conversion of the amino group to amide groups. The resulting amide groups are thus non-reactive to cases where the amino functionality is necessary. The inventors have also found that treating the as synthesized MOF with an acid such as HCl (see description below) substantially cleaves the amide and regenerates the amino group, i.e. activates it. The MOFs treated as disclosed herein have at least 55% of their amino groups activated, or at least 60%, or at least 65%, or at least 70%, or at least 75%, or at least 80%, or at least 85%, or at least 90% or at least 95%. This increase in amino activation results in an increase of the adsorption capacity or other amino functionality of the MOF versus the untreated MOF. Thus, the MOFs of the invention have the advantage of large crystals and adsorption capacity or other amino functionality comparable to or substantially the same as MOFs with nano-size crystals. This represents a significant advancement in synthesizing MOFs which can be used in applications where nano-sized MOFs can't be used yet have substantially the same adsorption capacity or other amino functionality as the nano-sized MOFs.

As used above and throughout the specification and the claims by "substantially" is meant at least 70% or at least 80% or at least 90% or at least 95%.

Another aspect of the invention is a process for preparing MOFs having activated amino groups. The first step of the synthesis involves preparing a solution of the desired metal ions and the at least one ligand. The metal is introduced as the metal salt. The salt can be the nitrate, halide, sulfate, carbonate, oxyhalide, oxynitrate, oxysulfate, oxycarbonate, etc., and mixtures thereof. Specific examples of salts which can be used include but are not limited to zirconium chloride, zirconium bromide, zirconium oxynitrate, zirconium oxychloride, vanadium chloride, copper sulfate, iron chloride, zinc nitrate, or zinc carbonate, and mixtures thereof.

As stated above, the ligand to be used can be at least one organic ligand containing an amino group or a combination of at least one organic ligand containing an amino group and at least one organic ligand that does not contain an amino group. Examples of organic ligands containing an amino group include but are not limited to 2-aminobenzene-1,4 dicarboxylic acid ($NH_2$-BDC), 5-aminoisophthalic acid, 3-aminobenzoic acid, 4-aminobenzoic acid and mixtures thereof. Examples of organic ligands that don't contain an amino group include but are not limited to terephthalic acid (BDC), isophthalic acid, benzoic acid, trimesic acid, acrylic acid and mixtures thereof. If a mixture of amino and non-amino containing ligands is used in the synthesis, they are added in molar ratios to arrive at the molar ratios desired in the MOF as stated above. The molar ratio of the metal salt to the ligand is also adjusted such that the specific molar ratio in the MOF is achieved.

The metal salt and at least one ligand are mixed in a solvent or a mixture of solvents. Examples of solvents which can be used include but are not limited to amides, alcohols, water and mixtures thereof. Specific mixtures are dimethylformamide, water, ethanol, and isopropanol.

A modulator is added to a reaction mixture either before, during, or after the addition of the other reagents. Preferably the modulator comprises at least one mono-carboxylic acid. Specific examples of mono-carboxylic acid modulators include but are not limited to formic acid, acetic acid, benzoic acid, dichloroacetic acid, trifluoroacetic acid and mixtures thereof. Optionally the modulator can be a mixture of one or more monocarboxylic acids and one or more inorganic acids, such as hydrochloric acid, nitric acid, and sulfuric acid. Those skilled in the art will recognize that the order of addition of reagents can be altered to optimize solubilities and reaction conditions.

Once the reaction mixture is formed, i.e. all components are solubilized, the reaction mixture is reacted at a temperature and time to form the desired MOF. Reaction temperature can vary from about 50° C. to about 200° C. or a temperature from about 75° C. to about 125° C. The reaction mixture is reacted at the desired temperature for a time selected from about 1 h to about 78 h or from about 8 h to about 48 h or from about 22 h to about 48 hr or from about 12 h to about 24 h. Once the MOF is formed, it is isolated by means such as filtration, centrifugation, etc.

When amino-containing MOFs are prepared using modulators in the reaction mixture, the result can be products in which at least one of the hydrogen atoms of the amino group is substituted with another moiety, thereby interfering with the desired activity of the amino group. The substituent moiety can be a residue of the modulator, such a monocarboxylate. For example, if formic acid is used as a modulator, then a formic group can become a substituent on the amino group, to create a formamide group instead of the desired unsubstituted amino group. Further, if DMF is used as a solvent, then some of the solvent can react with some of the amino groups to form formamide groups.

Figure 4:
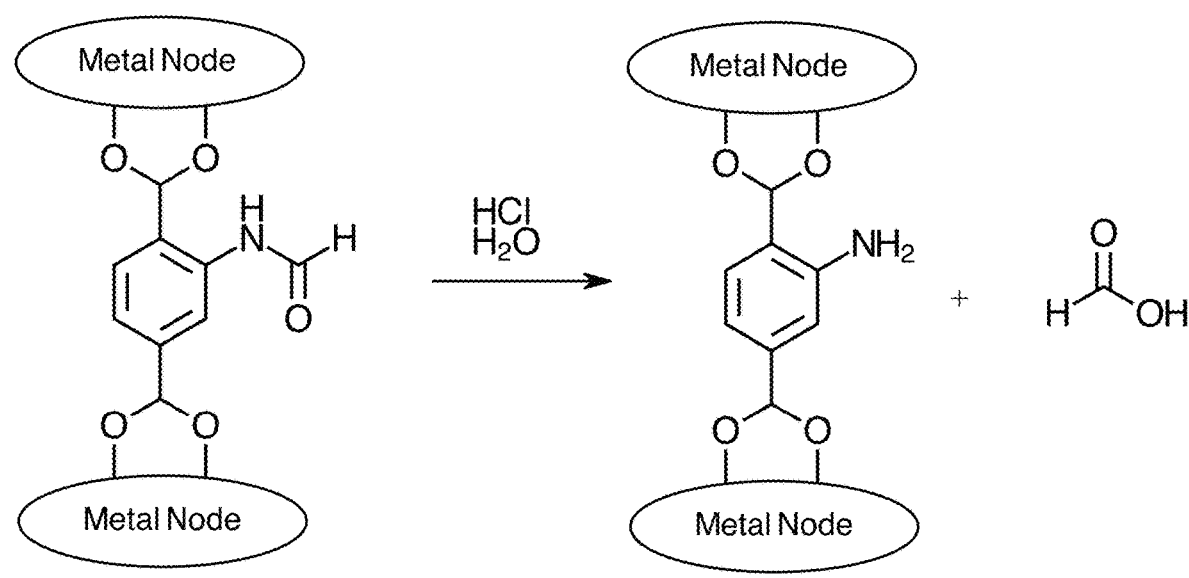
FIG. 4 Scheme illustrating the acid wash of the formamide-bearing MOF to convert the formamide group to the free amine.

In accordance with one aspect of the present invention, this problem is solved by washing the MOF with an inorganic acid to cleave the substituent from the amino group and restore the amino group to the unsubstituted activated form as illustrated in FIG. 4. In one embodiment, the MOF powder that has been isolated from the metal-ligand reaction mixture is next washed with an acid wash comprising at least one inorganic acid such as hydrochloric acid, nitric acid, sulfuric acid, phosphoric acid, hydrofluoric acid, and mixtures thereof to provide a MOF having activated amino groups. Optionally, the acid wash can be a mixture of one or more inorganic acids and one or more organic acids. Preferred inorganic acids include hydrochloric acid, nitric acid, and sulfuric acid. Preferred organic acids include formic acid. Before being used in a particular application, the wet and acid-treated MOF is dried at a temperature of about 40° C. to about 250° C. or a temperature from about 75° C. to about 150° C. The time for drying the wet MOF can vary substantially but is usually from about 2 hr. to about 336 hr. or from about 8 hr. to about 168 hr. or from about 8 hr. to about 48 hr. or from about 48 hr. to about 168 hr.

Where the MOF is to be used as an adsorbent, the MOF when treated with an acid wash as disclosed herein adsorbs more of a contaminant than an as synthesized MOF. For example, the acid-treated MOF can adsorb at least 10% more or at least 20% more or at least 30% more or at least 40% more or at least 50% more, or at least 60% more, or at least 70% more, or at least 80% more, or at least 90% more than the as-synthesized MOF. The acid-treated MOF can adsorb 2, 3, 5, 10, 15, 20, 30, 50, or 100 times the amount of contaminant versus an as-synthesized MOF.

As stated above, the MOFs of the invention are characterized in that they can (reversibly) adsorb various molecules. They, therefore, can be used to purify a gas stream by at least partially adsorbing at least one contaminant in the gas stream. Gas streams which may need to be purified include but are not limited to air streams, industrial gas streams, off-gassing streams, or pollutant gas streams. Contaminants which are present in these streams, which can be removed by the MOFs of the invention, include but are not limited to cyanogen chloride, hydrogen cyanide, hydrogen sulfide, phosgene, sulfur dioxide, boron tribromide, boron trichloride, bromine, bromine chloride, bromine trifluoride, carbonyl fluoride, chlorine, chlorine pentafluoride, chlorine trifluoride, chlorosulfonic acid, dichlorosilane, ethyl phosphonous dichloride, fluorine, hydrogen bromide, hydrogen chloride, hydrogen cyanide, hydrogen fluoride, hydrogen iodide, hydrogen sulfide, phosphorus trichloride, silicon tetrafluoride, sulfur dioxide, sulfur trioxide, sulfuric acid, sulfuryl chloride, titanium tetrachloride, tungsten hexafluoride, bromine pentafluoride, hydrogen selenide, nitric acid, nitrogen dioxide, nitrogen tetraoxide, nitrogen trioxide and mixtures thereof. The amount of contaminant which the MOF can remove is at least at least 50% or at least 60%, or at least 70%, or at least 80%, or at least 90% or at least 95%, or at least 99% of the contaminants. In one embodiment, the gas stream is an air stream, the contaminant is $NO_2$ and the MOF removes at least 80% of the $NO_2$ in the air stream. In another embodiment, a vessel, having an inlet and outlet port, is filled with the MOF material through which the gas stream is flowed through thereby substantially removing the contaminant from the stream. In order to achieve the desired removal amount, the gas stream is flowed through the MOF at a rate of about 10 L/min to about 500 L/min or a rate from about 30 L/min to about 200 L/min or a rate of about 50 L/min to about 120 L/min.

Although the MOF compositions of the invention can be used in the powder form, it may be advantageous to form the MOF composition into various shaped bodies such as pellets, spheres, disks, monolithic bodies, irregularly shaped particles and extrudates. The methods of forming these types of shapes are well known in the art. The MOF materials can be formed into various shapes by themselves or by including a binder. When selecting a binder, it is important to select a binder such that the surface area and adsorption capacity is not adversely affected once the desired shaped body is formed. Materials which can be used as binders include without limitation cellulose, silica, carbon, alumina, and mixtures thereof.

The forming process usually involves preparing a thick paste-like material by mixing the MOF composition with a solvent or a binder plus a solvent. Once the paste-like material is formed it can be extruded through a die having holes of about 1-2 mm to form extrudates of varying length, e.g. 6-10 mm. The paste or even the powder itself can be pressed at high pressure to form pellets or pills. Other means of forming shapes include pressure molding, metal forming, pelletizing, granulation, extrusion, rolling methods and marumerizing.

Another aspect of the invention involves depositing a catalytic metal onto the shaped MOF body or the MOF powder. The catalytic metal may be chosen from zinc, copper, nickel, chromium, molybdenum, tungsten, niobium, rhenium, vanadium, silver, platinum, palladium, rhodium, iridium, and mixtures thereof. Deposition of a catalytic metal onto the shaped MOF support is carried out by conventional means which usually involves taking a solution containing a compound of the desired metal and impregnating the shaped MOF body with it, followed by drying and optional treatments such as calcination, and/or reduction.

In yet another aspect of the invention, the MOF materials can be deposited onto articles such as, but not limited to, monoliths, spherical supports, ceramic foams, glass fibers, woven fabrics, nonwoven fabrics, membranes, pellets, extrudates, irregularly shaped particles, and mixtures thereof. When the desired article is a monolith, spherical support, ceramic foam, pellets, extrudates, or irregularly shaped particles, a slurry of the MOF composition is prepared and deposited on the article by means such as dipping, spray drying, etc. followed by drying and optionally calcination. For membranes it is possible to form the MOF composition directly on the membrane. The MOF compositions of the invention can be deposited or dispersed onto fabrics (woven and non-woven) or polymers by techniques such as electro-spinning, direct crystal growth, and layer by layer deposition.

The MOF containing articles described in the previous paragraphs can be used as is to purify air or other gas streams containing contaminants. The air or other gas streams can be flowed through the article, e.g. monolith, foam, membranes, fabrics whereby the MOF will adsorb at least a portion of the contaminants in percentage amounts as detailed above. The MOF articles can also be placed in various types of rigid containers. For example, extrudates or pills or spheres can be housed in a bed through which the air or other gas stream is flowed. The bed can be placed in various types of housings such as filter canisters having an inlet and outlet. Fabrics (both woven and non-woven) can also be formed into filters such as but not limited to pleated filters which again can be housed in rigid containers such as cartridges through which the stream to be treated flows. Pleated filters can also be supported in various shaped and sized frames and the gas stream flowed through it. The frames can be made of various types of materials such as but not limited to metal, wood and plastic. Fiber glass can be formed into glass wool and housed in rigid filter frames.

In the following Examples, all N2 gas adsorption and desorption measurements, unless stated otherwise, were performed on the Micromeritics Tristar II 3020 system (Micromeritics, Norcross, GA) at 77 K. Between 75-200 mg of samples were employed in each measurement. The specific surface areas for N2 were calculated using the Brunauer-Emmet Teller (BET) model in the range of $0.005<P/P_0<0.05$. The N2 uptakes were measured at $P/P_0=0.9$, where $P/P_0$ is the measured pressure relative to atmospheric pressure.

In the following Examples, all nitrogen dioxide adsorption and desorption measurements were performed at 25° C. on a Micromeritics 3Flex Surface Characterization Analyzer (Micromeritics, Norcross GA) by dosing to an absolute pressure and using a 3 second equilibration interval.

Example 1

A set of experiments were conducted to synthesize a series of $Zr(NH_2-BDC)$ MOFs. The parameters used for each experiment are presented in Table 1. The general procedure involved first dissolving the $NH_2$-BDC in DMF at room temperature. Once the $NH_2$-BDC was dissolved, an acid modulator was added to the reaction mixture, which was then heated to 90° C. When the target temperature was reached, $ZrO(NO_3)_2$ was added, either as a single dose or dosed in at a predetermined flow rate. Upon completion of the addition, the final reaction mixture was reacted for the desired amount of time. The resulting MOF powder was isolated by filtration, washed with DMF and acetone, and dried at 100° C. for 12 hours.

Samples from the examples above were treated under vacuum at 100° C. for 12 hours and examined for their BET surface area, nitrogen uptake, and pore volume. These results are presented in Table 2.

TABLE 2

Characterization of Synthesized MOFs

| Example Number | BET Surface Area ($m^2/g$) | Nitrogen Uptake ($cm^3/g$) | Pore Volume (cc/g) | Average Crystal Size (μm) |
|---|---|---|---|---|
| 1-1 | 1388 | 342 | 0.53 | 1-5 |
| 1-2 | 1228 | 309 | 0.48 | 1-1.5 |
| 1-3 | 1505 | 380 | 0.59 | 0.5-0.7 |
| 1-4 | 1155 | 371 | 0.47 | 1.5-4 |
| 1-5 | 967 | 305 | 0.49 | 1.5-2 |
| 1-6 | 1155 | 295 | 0.47 | 0.3-0.5 |
| 1-7 | 1200 | 307 | 0.47 | 0.1-0.5 (agglomerates) |
| Control | 800-1075 | | 0.31-0.41 | 0.1-0.5 (agglomerates) |

For comparison, a control sample of UiO-66-BDC-$NH_2$ MOF was purchased from Strem Chemicals, Inc., Newburyport, MA, catalog no. 40-1109, stated to have a particle size of 0.1-0.5 micron and pore volume of 0.31-0.41 cc/g.

FIG. 1A is a photomicrograph on a 2 micron scale of the control sample showing agglomerates of much smaller particles, likely nanoparticles. FIG. 1B is a photomicrograph on a 10 micron scale of the product of Example 1-1 showing crystal sizes of 1-5 μm. It may be seen that greater magnification is required to see the particle structure of the control sample, and that even under greater magnification the control sample particles appear to be poorly formed and agglomerated.

The nanoparticle agglomerates of the control sample and Example 1-7 are less desirable for use in filtration of air contaminants, compared to MOFs of the present invention synthesized using a modulator and providing single crystals in the 1-5 μm range or greater. Furthermore, the surface area of the control MOF ranges from 800-1075 $m^2/g$. The MOF synthesized in accordance with the invention herein using a modulator and an acid wash affords a material with improved surface area, improved crystal size, and improved amino functionality.

TABLE 1

Parameters for MOF Synthesis

| Example Number | $ZrO(NO_3)_2$ (g) | NH2-BDC(g) | DMF (L) | Acid Type | Acid (L) | Water (L) | Metal Dosing Rate (mL/min) | Reaction Time (hrs) |
|---|---|---|---|---|---|---|---|---|
| 1-1 | 25.3 | 10.8 | 0.50 | Formic Acid | 0.50 | 0 | N/A | 48 |
| 1-2 | 25.3 | 10.8 | 0.47 | Formic Acid | 0.47 | 0.06 | N/A | 24 |
| 1-3 | 101.1 | 43.2 | 0.50 | Formic Acid | 0.50 | 0 | N/A | 48 |
| 1-4 | 50.6 | 21.6 | 0.44 | Formic Acid | 0.44 | 0.13 | 0.5 | 24 |
| 1-5 | 101.1 | 43.2 | 0.33 | Formic Acid | 0.41 | 0.26 | 0.5 | 48 |
| 1-6 | 50.6 | 21.6 | 0.44 | Formic Acid | 0.44 | 0.13 | 2.1 | 22 |
| 1-7 | 25.3 | 10.8 | 0.5 | HCl | 0.03 | 0 | N/A | 24 |

Example 2

A quantity of MOF was prepared using the procedure of Example 1-1. Samples of the resulting MOF were treated with different acids to activate the amino groups on the MOF by hydrolysing the formamide substituent to expose the amino group and release formic acid, in accordance with the reaction as illustrated in FIG. 4. The procedure involved taking the MOF, washing it with acid, and then drying it. For each of samples B—O herein, 200 g of $Zr(NH_2\text{-BDC})$ MOF was washed with 2 L of acid at various concentrations to determine the degree of amide hydrolysis and porosity retention. The 200 g of MOF was stirred with 2 L of acidic solution for 12 hours at different temperatures. Following acid washing, the MOF was washed with acetone to remove any remaining acid, water, or hydrolyzed formic acid, which was cleaved from the amide. After acetone washing, the MOF was dried at 100° C. for 12 hours and the BET surface area, $N_2$ uptake, and $NO_2$ uptake were measured (Table 3). Sample A is a sample of the material of Example 1-1 which was not acid washed, and the Control is the commercially purchased material which was not acid washed.

perature (rt) to 60° C. increases the amount of amide hydrolyzed but the surface area decreases more versus room temperature treatment. For nitric acid, high acid concentrations (1M to 0.25M) result in a higher decrease in surface area. Similarly, a 1M solution of sulfuric acid while hydrolyzing the amide group results in a higher decrease in surface area.

Figure 3:
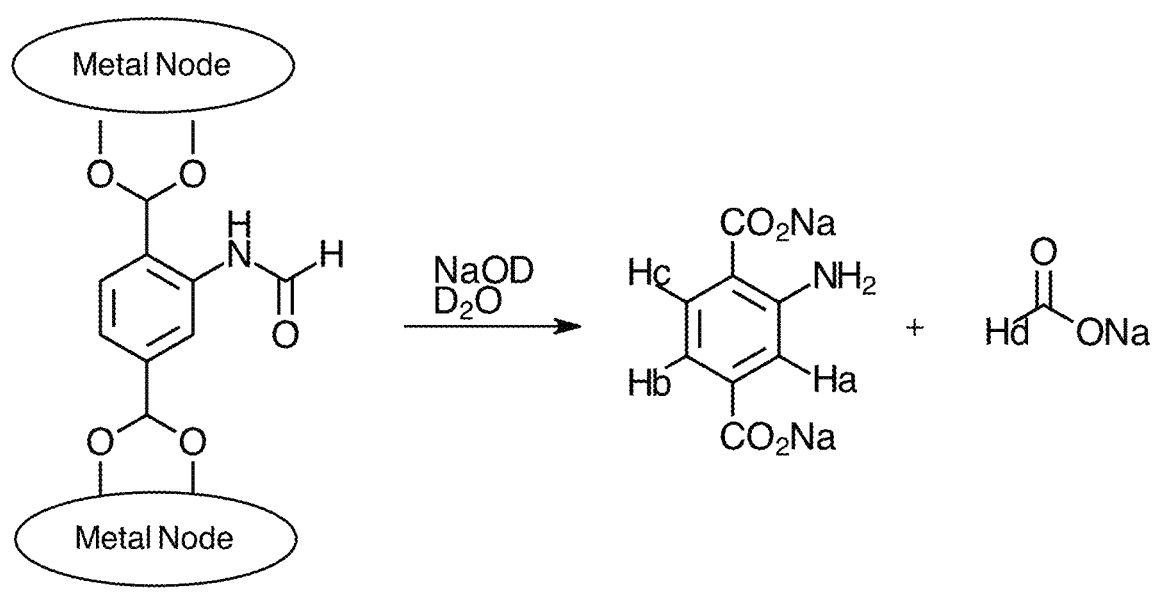
FIG. 3 Scheme illustrating the digestion of the Zr($NH_2$-BDC) MOF to determine degree of formamide groups.

The extent of amide hydrolysis was measured using $^1$H-NMR spectrophotometry as follows. Each MOF sample that had been washed to activate the amino groups and dried as described above was treated with a $NaOD/D_2O$ solution in order to digest the MOF and fully cleave the formamide group, according to the reaction scheme illustrated in FIG. 3, leaving a mixture of activated $NH_2$-BDC (linker cleaved from the MOF framework) and cleaved formic acid. The $^1$H-NMR spectrum of this mixture was measured and used to calculate the amount of formamide groups remaining after the acid wash. Referring to FIG. 3, the $^1$H-NMR spectra are used by comparing Hc (0 d, 7.55 ppm) on the $NH_2$-BDC linker and Hd (0 s, 8.3 ppm) on the cleaved formic acid. A higher proportion of cleaved formic acid indicates that prior to digestion the MOF had a higher proportion of formamide

TABLE 3

Characterization of acid washed MOFs

| Sample No. | Acid | Acid Molarity | Temp (° C.) | Formic acid:$NH_2$-BDC | $N_2$ BET ($m^2/g$) | $N_2$ Uptake (cc/g) | $NO_2$ Uptake (mmol/g) at 50 Torr; 25° C. |
|---|---|---|---|---|---|---|---|
| A | No acid | 0 | | 2.55:1 | 1388 | 342 | 0.58 |
| B | HCl | 1 | rt | 0.08:1 | 1286 | 350 | 8.3 |
| C | HCl | 1 | 60 | 0.03:1 | 1215 | 333 | — |
| D | HCl | 0.5 | rt | 0.18:1 | 1354 | 359 | 7.6 |
| E | HCl | 0.25 | rt | 0.45:1 | 1235 | 336 | 5.8 |
| F | HCl | 0.1 | rt | 1:02:1 | 1354 | 357 | 3.3 |
| G | HCl | 0.05 | rt | 1.10:1 | 1465 | 400 | 3 |
| H | $HNO_3$ | 1 | rt | 0.11:1 | 705 | 173 | 4.8 |
| I | $HNO_3$ | 1 | 60 | 0.03:1 | 658 | 165 | — |
| J | $HNO_3$ | 0.5 | rt | 0.19:1 | 985 | 268 | — |
| K | $HNO_3$ | 0.25 | rt | 0.34:1 | 1161 | 310 | — |
| L | $HNO_3$ | 0.1 | rt | 0.81:1 | 1286 | 350 | — |
| M | $HNO_3$ | 0.05 | rt | 1.06:1 | 1423 | 385 | — |
| N | $H_2SO_4$ | 1 | rt | 0.07:1 | 670 | 168 | 4.4 |
| O | $H_2SO_4$ | 1 | 60 | 0:1 | 608 | 152 | — |
| Control | No acid | 0 | | 0.45:1 | 800-1075 | | 3.1 |

Table 3 shows the results of these experiments using washes of different acids and different concentrations of acids. Sample A of Table 3 shows the characterization of the MOF of Example 1-1 which was not acid washed: the formic acid to MOF linker ratio was found to be 2.55:1 (this includes formic acid groups bound directly to the metal framework, as well as those bound to the organic ligand). Comparing this to sample B, after acid washing, the formic acid to MOF linker ratio significantly decreased to 0.08:1 while the MOF surface area decreased only slightly. This decrease in the ratio of formic acid to $NH_2$-BDC indicates that the formamide group had been hydrolyzed in the acid wash step and the amino group regenerated.

Table 3 also shows how different acids and acid concentrations affect the hydrolysis of the amide group and the surface area of the MOF. For all three acids (HCl, $HNO_3$, and $H_2SO_4$) decreasing the molarity from 1M to 0.05 M decreases the amount of hydrolysis which takes place. At a concentration of 0.05M the ratio of formic acid to $NH_2$-BDC drops from 2.55:1 to 1.10:1. As the acid concentration is decreased, the surface area of the MOF is less affected. For all three acids, increasing the temperature from room temgroups; a lower proportion of cleaved formic acid indicates that prior to digestion the MOF had a lower proportion of formamide groups, i.e., that the formamide groups had been hydrolyzed by the acid wash step to activate the amino groups.

Figure 2A:
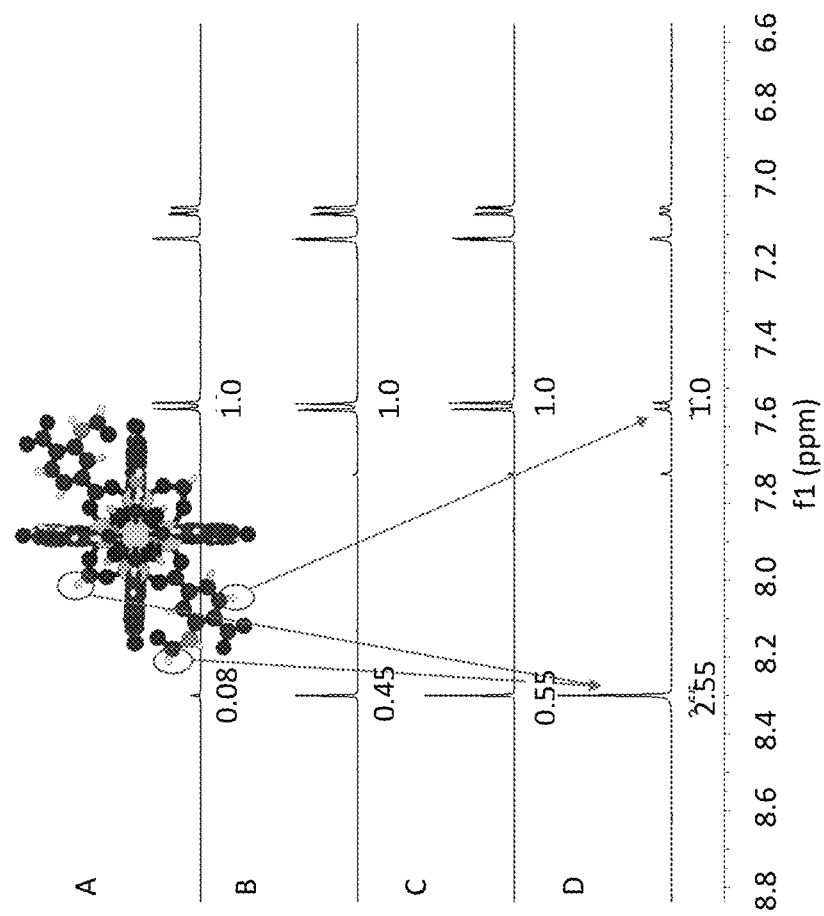
FIG. 2A $^1$H-NMR spectra for various Zr($NH_2$-BDC) digested formulations. Insert illustrates crystallographic structure of a Zr($NH_2$-BDC) with formamide groups still intact.

FIG. 2A illustrates $^1$H-NMR spectra of four digested samples in which spectrum A corresponds to Sample B, spectrum B is the Control, spectrum C is Example 1-7 (Table 1) which had not been acid washed, and spectrum D is Sample A of Table 3; the insert in FIG. 2A illustrates the MOF structure prior to the acid wash and illustrates which protons on the MOF structure correspond to the $^1$H-NMR peaks. The peak at 8.3 ppm represents the sum of the signals from the Hd protons on the carbon atoms of the formamide groups attached to the MOF ligands and to the MOF corner metal units, as shown in the insert of FIG. 2A. It may be seen that the peak is highest in spectrum D corresponding to Sample A, in which formic acid is used as a modulator in the MOF synthesis and there is no acid wash. There is also a significant formamide peak in the commercial control sample (spectrum B) and in the sample made with HCl (spectrum C). In spectrum A corresponding to Sample B in which the MOF has been washed with 1.0 M HCl the formamide peak is negligible.

Figure 2B:
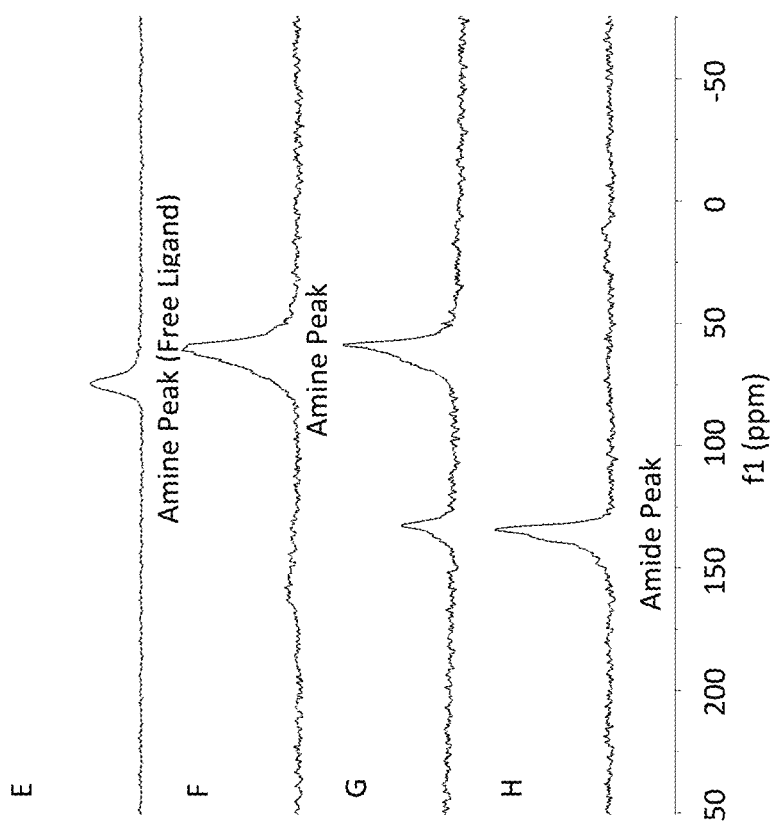
FIG. 2B Solid state $^{15}$N-NMR spectra for Zr($NH_2$-BDC) formulations prior to digestion.

These results are consistent with the solid-state $^{15}$N-NMR of these same samples illustrated in FIG. 2B in which the peaks indicate the presence of amide groups and amine groups. As a reference, spectrum E is $^{15}$NH$_2$-BDC as the free ligand indicating the chemical shift of the free amine peak. Spectrum F is the product of Sample B, spectrum G is the product of Example 1-7 (Table 1), and Spectrum H is Sample A. These spectra show that formyl amides are present in all Zr (NH$_2$-BDC) formulations that have not been acid washed. Sample A (spectrum H) which had not been acid washed showed a substantial amide peak and almost no amine peak, while Sample B (spectrum F) which had been acid washed showed essentially no amide peak and a strong amine peak.

Corresponding to the removal of the formamide group, the increase in free-amino groups increases the adsorption of NO$_2$ (Table 3), as measured by NO$_2$ single component isotherms. More specifically, for the untreated MOF (Sample A of Table 3), the NO$_2$ adsorption capacity measured at 50 Torr and at 25° C. was only 0.58 mmol/g, while after washing with HCl the NO$_2$ capacity increased to 8.3 mmol/g at 50 Torr and at 25° C. (Sample B; Table 3). Similar results were observed for nitric acid (sample H) and sulfuric acid (sample N).

Additionally, the Control MOF exhibits a 45% degree of amide groups which decreases the available amino groups for reactivity (FIG. 2A (spectrum B) and Table 3). In contrast, the acid-treated MOFs exhibit reduction of the undesired amide groups from 255% incorporation (including the formamide groups attached to the ligand and those attached to the corner metal units) to 3-8% incorporation (FIG. 2A (spectrum A) and Table 3) thus freeing up the majority of the amino groups for reactivity with air pollutants. These improved properties of increased crystal size, higher degree of reactive free-amines, and higher surface areas afford MOFs with more desirable attributes, particularly for air filtration. over the commercially available material.

We claim as our invention:

1. A metal organic framework (MOF) composition comprising:
   corner metal units comprising metal ion atoms where the metal is selected from Zr, V, Al, Fe, Cr, Ti, Hf, Cu, Zn, Ni, and Ce, and mixtures thereof and linker molecules selected from at least one organic ligand containing an amino group or a combination of at least one organic ligand containing an amino group and at least one organic ligand that does not contain an amino group; the MOF characterized in that it has an average crystal size of at least about 1 μm in at least one dimension, and in which at least 55% of the amino groups are activated amino groups of the form —NH$_2$.

2. The composition of claim 1 where the at least one organic ligand containing an amino group is selected from 2-aminobenzene-1,4 dicarboxylic acid (NH$_2$-BDC), 5-aminoisophthalic acid, 3-aminobenzoic acid, 4-aminobenzoic acid and mixtures thereof.

3. The composition of claim 1 where the at least one organic ligand that does not contain an amino group is selected from terephthalic acid (BDC), isophthalic acid, benzoic acid, trimesic acid, acrylic acid and mixtures thereof.

4. The composition of claim 1 wherein the metal is Zr and the ligand is 2-aminobenzene-1,4 dicarboxylic acid (NH$_2$-BDC).

5. The composition of claim 1 wherein the MOF has an average crystal size from at least about 1 μm to about 100 μm.

6. The composition of claim 1 wherein at least one of the corner metal units has at least one free coordination site.

7. The composition of claim 1 further characterized in that it adsorbs at least one contaminant from a gas stream.

8. The composition of claim 1 further characterized in that it has a pore volume from about 0.2 cc/g to about 0.8 cc/g.

9. The composition of claim 7 where the contaminant is selected from cyanogen chloride, hydrogen cyanide, hydrogen sulfide, phosgene, sulfur dioxide, boron tribromide, boron trichloride, bromine, bromine chloride, bromine trifluoride, carbonyl fluoride, chlorine, chlorine pentafluoride, chlorine trifluoride, chlorosulfonic acid, dichlorosilane, ethyl phosphonous dichloride, fluorine, hydrogen bromide, hydrogen chloride, hydrogen cyanide, hydrogen fluoride, hydrogen iodide, hydrogen sulfide, phosphorus trichloride, silicon tetrafluoride, sulfur dioxide, sulfur trioxide, sulfuric acid, sulfuryl chloride, titanium tetrachloride, tungsten hexafluoride, bromine pentafluoride, hydrogen selenide, nitric acid, nitrogen dioxide, nitrogen tetraoxide, nitrogen trioxide, and mixtures thereof.

10. The composition of claim 1 wherein the MOF has a BET surface area of at least 1000 m$^2$/g.

11. The MOF composition of claim 1 wherein said composition is present as a powder.

12. The MOF composition of claim 1 wherein said composition is present as a shaped body selected from the group consisting of pellets, spheres, disks, monolithic bodies, irregularly shaped particles, and extrudates.

13. The MOF composition of claim 12 wherein said shaped body further comprises a binder.

14. The MOF composition of claim 13 wherein said binder is selected from the group consisting of cellulose, silica, carbon, alumina, and mixtures thereof.

15. The MOF composition of claim 1 wherein said MOF composition is present as a powder or a shaped body, and further comprising a catalytic metal deposited thereon.

16. The MOF composition of claim 15 wherein said catalytic metal is selected from the group consisting of zinc, copper, nickel, chromium, molybdenum, tungsten, niobium, rhenium, vanadium, silver, platinum, palladium, rhodium, iridium and mixtures thereof.

17. An article comprising the MOF composition of claim 1 deposited thereon.

18. The article of claim 17 wherein said article is selected from monoliths, spherical supports, ceramic foams, glass fibers, woven fabrics, nonwoven fabrics, membranes, pellets, extrudates, irregularly shaped particles, and mixtures thereof.

19. An adsorbent composition comprising the composition of claim 1.

* * * * *